United States Patent
Sasaki (10) Patent No.: US 12,365,359 B2
(45) Date of Patent: Jul. 22, 2025

(54) VEHICLE, VEHICLE PLATFORM, VEHICLE CONTROL INTERFACE BOX, AUTONOMOUS DRIVING KIT, CONTROL METHOD OF VEHICLE, AND CONTROL METHOD OF VEHICLE PLATFORM FOR PLATFORM-ADAPTIVE CONTROL

(71) Applicant: TOYOTA JIDOSHA KABUSHIKI KAISHA, Toyota (JP)

(72) Inventor: Tomo Sasaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 328 days.

(21) Appl. No.: 17/890,437

(22) Filed: Aug. 18, 2022

(65) Prior Publication Data
US 2023/0130452 A1     Apr. 27, 2023

(30) Foreign Application Priority Data
Oct. 27, 2021   (JP) ................................. 2021-175522

(51) Int. Cl.
*B60W 60/00*     (2020.01)
(52) U.S. Cl.
CPC ................................ *B60W 60/001* (2020.02)
(58) Field of Classification Search
CPC .................................................. B60W 60/001
See application file for complete search history.

(56) References Cited

U.S. PATENT DOCUMENTS

| | | | |
|---|---|---|---|
| 2019/0299927 A1* | 10/2019 | Ando | B60K 28/12 |
| 2021/0237765 A1 | 8/2021 | Ando | |
| 2021/0237766 A1 | 8/2021 | Suzuki et al. | |
| 2021/0286356 A1* | 9/2021 | Yang | G05D 1/0282 |
| 2022/0126858 A1* | 4/2022 | Liu | B60W 60/001 |

FOREIGN PATENT DOCUMENTS

| | | |
|---|---|---|
| JP | 2018-132015 A | 8/2018 |
| JP | 2021-123135 A | 8/2021 |
| JP | 2021-123138 A | 8/2021 |

* cited by examiner

*Primary Examiner* — James J Lee
*Assistant Examiner* — Steven Vu Nguyen
(74) *Attorney, Agent, or Firm* — Oliff PLC (57) ABSTRACT

The VCIB includes a memory, a communication unit, and a processor. The memory stores beforehand pieces of execution information that are used to execute processes corresponding respectively to a plurality of APIs included in an API set that is a combination of APIs for requesting the VP to execute a predetermined function and requesting transmission of predetermined information from the VP. The communication unit receives, from the ADK, a request according to an API included in a permitted API set that the ADK is permitted to use beforehand. The processor executes a process corresponding to the request received by the communication unit by using execution information for an API relating to the request that is stored in the memory.

10 Claims, 3 Drawing Sheets

ND CONTROL
VEHICLE, VEHICLE PLATFORM, VEHICLE CONTROL INTERFACE BOX, AUTONOMOUS DRIVING KIT, CONTROL METHOD OF VEHICLE, AND CONTROL METHOD OF VEHICLE PLATFORM FOR PLATFORM-ADAPTIVE CONTROL

CROSS-REFERENCE TO RELATED APPLICATION

This application claims priority to Japanese Patent Application No. 2021-175522 filed on Oct. 27, 2021, incorporated herein by reference in its entirety.

BACKGROUND

1. Technical Field

This disclosure relates to a vehicle, a vehicle platform, a vehicle control interface box, an autonomous driving kit, a control method of a vehicle, and a control method of a vehicle platform. In particular, this disclosure relates to a vehicle including a vehicle platform having functions to run, turn, and stop, an autonomous driving kit that is attachable to and detachable from the vehicle platform and gives an instruction for autonomous driving to the vehicle platform, and a vehicle control interface box that outputs a control command for controlling the vehicle platform, and further relates to the vehicle platform, the vehicle control interface box, the autonomous driving kit, a control method of the vehicle, and a control method of the vehicle platform.

2. Description of Related Art

Recently, autonomous driving systems for realizing autonomous driving functions of vehicles have been proposed (e.g., see Japanese Unexamined Patent Application Publication No. 2018-132015 (JP 2018-132015 A)).

SUMMARY

When installing an autonomous driving system in a vehicle platform, enabling appropriate control for any vehicle platform is considered as an issue.

This disclosure has been contrived to solve this issue, and an object thereof is to provide a vehicle, a vehicle platform, a vehicle control interface box, an autonomous driving kit, a control method of a vehicle, and a control method of a vehicle platform that enable appropriate control for any vehicle platform.

A vehicle according to this disclosure is a vehicle including a vehicle platform having functions to run, turn, and stop, an autonomous driving kit that is attachable to and detachable from the vehicle platform and gives an instruction for autonomous driving to the vehicle platform, and a vehicle control interface box that outputs a control command for controlling the vehicle platform. The vehicle control interface box includes a storage unit, a communication unit, and a control unit. The storage unit stores pieces of execution information that are used to execute processes corresponding respectively to a plurality of APIs included in an API set that is a combination of APIs for requesting the vehicle platform to execute a predetermined function and requesting transmission of predetermined information from the vehicle platform, the pieces of execution information being stored for a plurality of types of API sets beforehand. The communication unit receives, from the autonomous driving kit, a request according to an API included in a permitted API set that the autonomous driving kit is permitted to use beforehand among the plurality of types of API sets. The control unit executes a process corresponding to the request received by the communication unit by using execution information for an API relating to the request among the pieces of execution information for the permitted API set stored in the storage unit.

According to this configuration, the pieces of execution information for the API sets corresponding respectively to the types of vehicle platforms are stored beforehand in the storage unit of the vehicle control interface box. Thus, in whichever vehicle platform the vehicle control interface box may be installed, the vehicle platform can be appropriately controlled using the API set corresponding to the vehicle platform. As a result, it is possible to provide a vehicle that enables appropriate control for any vehicle platform.

Further, by storing the pieces of execution information for the API sets corresponding to a plurality of types of vehicle platforms, the vehicle control interface box can adapt to a plurality of types of vehicle platforms. This eliminates the need to prepare, for each vehicle platform, a vehicle control interface box for an API set corresponding to the vehicle platform. Thus, the costs of manufacturing and distributing a vehicle control interface box can be reduced.

The communication unit may receive authentication information that allows identification of the permitted API set from the autonomous driving kit. The control unit may determine whether permission for use of the permitted API set identified by the authentication information received by the communication unit is genuine. When the control unit determines that permission for use of the permitted API set is genuine, the control unit may execute the process corresponding to the request received by the communication unit.

According to this configuration, the vehicle platform can be controlled by reliably using an appropriate API set corresponding to the vehicle platform.

A manufacturer of the vehicle, the vehicle platform, or the vehicle control interface box may permit a manufacturer of the autonomous driving kit to use the permitted API set beforehand. According to this configuration, if the autonomous driving kit is one manufactured by a manufacturer who is permitted to use the permitted API set beforehand, the autonomous driving kit can appropriately control a vehicle platform when installed in the vehicle platform.

The autonomous driving kit and the vehicle control interface box may be connected to each other through an on-board communication network. According to this configuration, the autonomous driving kit and the vehicle control interface box can reliably communicate with each other.

Another aspect of this disclosure is a vehicle platform having functions to run, turn, and stop and including a vehicle control interface box that outputs a control command for controlling the vehicle platform. The vehicle control interface box includes a storage unit, a communication unit, and a control unit. The storage unit stores pieces of execution information that are used to execute processes corresponding respectively to a plurality of APIs included in an API set that is a combination of APIs for requesting the vehicle platform to execute a predetermined function and requesting transmission of predetermined information from the vehicle platform, the pieces of execution information being stored for a plurality of types of API sets beforehand. The communication unit receives, from an autonomous driving kit that is attachable to and detachable from the vehicle platform and gives an instruction for autonomous driving to the vehicle platform, a request according to an API included in a permitted API set that the autonomous driving kit is permitted to use beforehand among the plurality of types of API sets. The control unit executes a process corresponding to the request received by the communication unit by using execution information for an API relating to the request among the pieces of execution information for the permitted API set stored in the storage unit.

According to this configuration, it is possible to provide a vehicle platform that enables appropriate control for any vehicle platform.

Yet another aspect of this disclosure is a vehicle control interface box that is installed in a vehicle platform having functions to run, turn, and stop and outputs a control command for controlling the vehicle platform. The vehicle control interface box includes a storage unit, a communication unit, and a control unit. The storage unit stores pieces of execution information that are used to execute processes corresponding respectively to a plurality of APIs included in an API set that is a combination of APIs for requesting the vehicle platform to execute a predetermined function and requesting transmission of predetermined information from the vehicle platform, the pieces of execution information being stored for a plurality of types of API sets beforehand. The communication unit receives, from an autonomous driving kit that is attachable to and detachable from the vehicle platform and gives an instruction for autonomous driving to the vehicle platform, a request according to an API included in a permitted API set that the autonomous driving kit is permitted to use beforehand among a plurality of types of API sets. The control unit executes a process corresponding to the request received by the communication unit by using execution information for an API relating to the request among the pieces of execution information for the permitted API set stored in the storage unit.

According to this configuration, it is possible to provide a vehicle control interface box that enables appropriate control for any vehicle platform.

Yet another aspect of this disclosure is an autonomous driving kit that is attachable to and detachable from a vehicle platform having functions to run, turn, and stop and gives an instruction for autonomous driving to the vehicle platform. The autonomous driving kit includes a control unit and a communication unit. The control unit controls the communication unit so as to transmit, to the vehicle platform, a request according to an API included in a permitted API set that the autonomous driving kit is permitted to use beforehand among a plurality of types of API sets that is each a combination of APIs for requesting the vehicle platform to execute a predetermined function and requesting transmission of predetermined information from the vehicle platform. In the vehicle platform, a process corresponding to the request transmitted by the communication unit is executed by using execution information for an API relating to the request among pieces of execution information that are used to execute processes corresponding respectively to a plurality of APIs included in the permitted API set.

According to this configuration, it is possible to provide an autonomous driving kit that enables appropriate control for any type of vehicle platform.

Yet another aspect of this disclosure is a control method of a vehicle including a vehicle platform having functions to run, turn, and stop, an autonomous driving kit that is attachable to and detachable from the vehicle platform and gives an instruction for autonomous driving to the vehicle platform, and a vehicle control interface box that outputs a control command for controlling the vehicle platform. The vehicle control interface box includes a storage unit, a communication unit, and a control unit. The storage unit stores pieces of execution information that are used to execute processes corresponding respectively to a plurality of APIs included in an API set that is a combination of APIs for requesting the vehicle platform to execute a predetermined function and requesting transmission of predetermined information from the vehicle platform, the pieces of execution information being stored for a plurality of types of API sets beforehand. The control method includes: a step in which the communication unit receives, from the autonomous driving kit, a request according to an API included in a permitted API set that the autonomous driving kit is permitted to use beforehand among a plurality of types of API sets; and a step in which the control unit executes a process corresponding to the request received by the communication unit by using execution information for an API relating to the request among the pieces of execution information for the permitted API set stored in the storage unit.

According to this configuration, it is possible to provide a control method of a vehicle that enables appropriate control for any vehicle platform.

Yet another aspect of this disclosure is a control method of a vehicle platform having functions to run, turn, and stop, the control method employing an autonomous driving kit that is attachable to and detachable from the vehicle platform and gives an instruction for autonomous driving to the vehicle platform. The autonomous driving kit includes a control unit and a communication unit. The control method includes a step in which the control unit controls the communication unit so as to transmit, to the vehicle platform, a request according to an API included in a permitted API set that the autonomous driving kit is permitted to use beforehand among a plurality of types of API sets that is each a combination of APIs for requesting the vehicle platform to execute a predetermined function and requesting transmission of predetermined information from the vehicle platform. In the vehicle platform, a process corresponding to the request transmitted by the communication unit is executed by using execution information for an API relating to the request among pieces of execution information that are used to execute processes corresponding respectively to a plurality of APIs included in the permitted API set.

According to this configuration, it is possible to provide a control method of a vehicle platform that enables appropriate control for any vehicle platform.

According to this disclosure, it is possible to provide a vehicle, a vehicle platform, a vehicle control interface box, an autonomous driving kit, a control method of a vehicle, and a control method of a vehicle platform that enable appropriate control for any vehicle platform.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of this disclosure will be described in detail below with reference to the drawings. The same or equivalent parts in the drawings will be denoted by the same reference signs and the description thereof will not be repeated.

Embodiment

Overall Configuration

Figure 1:
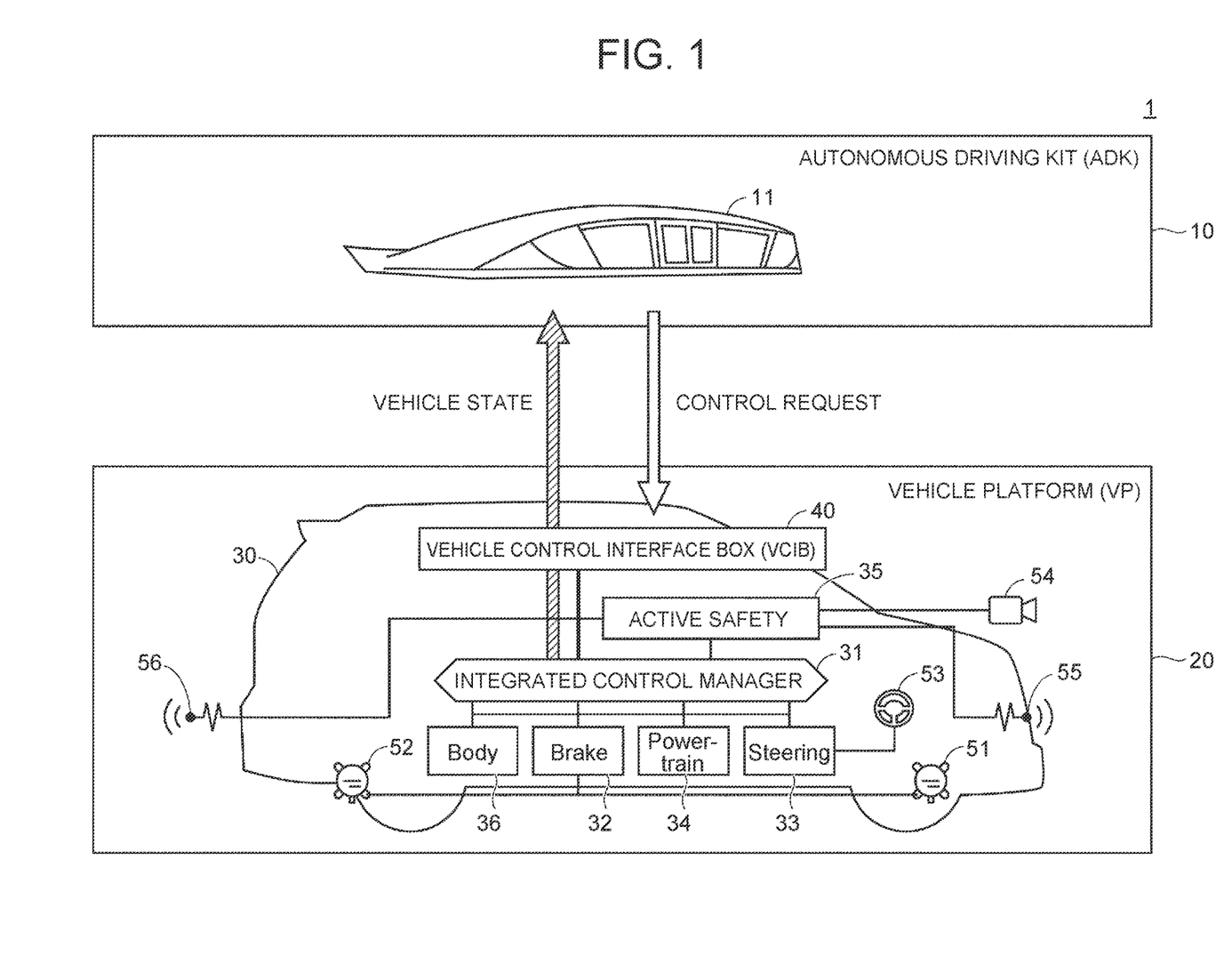
FIG. 1 is a diagram showing an overview of a vehicle according to an embodiment of this disclosure.

FIG. 1 is a diagram showing an overview of a vehicle 1 according to an embodiment of this disclosure. The vehicle 1 includes an autonomous driving kit (ADK) 10 and a vehicle platform (VP) 20. The ADK 10 is configured to be mountable to the VP 20 (attachable to and detachable from the vehicle 1). The ADK 10 and the VP 20 are configured to be able to communicate with each other through a vehicle control interface (a VCIB 40 to be described later).

The VP 20 can perform autonomous driving according to a control request from the ADK 10. In FIG. 1, the ADK 10 is shown at a position away from the VP 20, but in reality the ADK 10 is mounted to a rooftop etc. of the VP 20. The ADK 10 can also be removed from the VP 20. When the ADK 10 has been removed, the VP 20 executes travel control in manual mode (travel control according to a user's operation).

The ADK 10 includes an autonomous driving system (ADS) 11 for performing autonomous driving of the vehicle 1. For example, the ADS 11 creates a travel plan of the vehicle 1. The ADS 11 outputs various control requests for causing the vehicle 1 to travel in accordance with the travel plan to the VP 20 according to an application program interface (API) defined for each control request. Further, the ADS 11 receives various signals showing a vehicle state (a state of the VP 20) from the VP 20 according to an API defined for each signal. Then, the ADS 11 reflects the vehicle state in the travel plan. The detailed configuration of the ADS 11 will be described using FIG. 2.

The VP 20 incudes a base vehicle 30 and a vehicle control interface box (vehicle control interface box (VCIB)) 40.

The base vehicle 30 executes various types of vehicle control according to a control request from the ADK 10 (ADS 11). The base vehicle 30 includes various systems and various sensors for controlling the base vehicle 30. More specifically, the base vehicle 30 includes an integrated control manager 31, a brake system 32, a steering system 33, a powertrain system 34, an active safety system 35, a body system 36, wheel speed sensors 51, 52, a pinion angle sensor 53, a camera 54, and radar sensors 55, 56.

The integrated control manager 31 includes a processor (not shown), such as a central processing unit (CPU), and memories (not shown), such as a read-only memory (ROM) and a random-access memory (RAM), and integrally controls the aforementioned systems involved in the operation of the vehicle 1 (the brake system 32, the steering system 33, the powertrain system 34, the active safety system 35, and the body system 36).

The brake system 32 is configured to control a braking device provided in each wheel of the base vehicle 30. The braking device includes, for example, a disk brake system (not shown) that operates according to an oil pressure adjusted by an actuator.

The wheel speed sensors 51, 52 are connected to the brake system 32. The wheel speed sensor 51 detects a rotation speed of a front wheel of the base vehicle 30 and outputs the detected rotation speed of the front wheel to the brake system 32. The wheel speed sensor 52 detects a rotation speed of a rear wheel of the base vehicle 30 and outputs the detected rotation speed of the rear wheel to the brake system 32. The brake system 32 outputs the rotation speed of each wheel as one of pieces of information included in the vehicle state to the VCIB 40. Further, the brake system 32 generates a braking instruction for the braking device according to a predetermined control request output from the ADS 11 through the VCIB 40 and the integrated control manager 31. The brake system 32 controls the braking device using the generated braking instruction. The integrated control manager 31 can calculate the speed of the vehicle 1 (vehicle speed) based on the rotation speed of each wheel.

The steering system 33 is configured to be able to control the steering angle of a steering wheel (a turning angle of tires) of the vehicle 1 using a steering device. For example, the steering device includes a rack-and-pinion electric power steering (EPS) that can adjust the steering angle by an actuator.

The pinion angle sensor 53 is connected to the steering system 33. The pinion angle sensor 53 detects a rotation angle (pinion angle) of a pinion gear coupled to a rotating shaft of an actuator and outputs the detected pinion angle to the steering system 33. The steering system 33 outputs the pinion angle as one of pieces of information included in the vehicle state to the VCIB 40. Further, the steering system 33 generates a steering instruction for the steering device according to a predetermined control request output from the ADS 11 through the VCIB 40 and the integrated control manager 31. The steering system 33 controls the steering device using the generated steering instruction.

The powertrain system 34 controls an electric parking brake (EPB) system 341 provided in at least one of the wheels, a parking lock (P-Lock) system 342 provided in a transmission of the vehicle 1, and a propulsion system 343 including a shift device (not shown) configured to be able to select a shift range. The detailed configuration of the powertrain system 34 will be described using FIG. 2.

The active safety system 35 detects obstacles (pedestrians, bicycles, parked vehicles, utility poles, etc.) on a front side and a rear side using the camera 54 and the radar sensors 55, 56. The active safety system 35 determines whether there is a possibility that the vehicle 1 may collide with an obstacle based on a distance between the vehicle 1 and the obstacle and a moving direction of the vehicle 1. When it is determined that there is a possibility of a collision, the active safety system 35 outputs a braking instruction to the brake system 32 through the integrated control manager 31 so as to increase the braking force.

The body system 36 is configured to control parts including a direction indicator, a horn, and a wiper (none of which is shown) according to, for example, the travel state of the vehicle 1, the environment, or the like. The body system 36 controls these parts according to a predetermined control request output from the ADS 11 through the VCIB 40 and the integrated control manager 31.

The VCIB 40 is configured to be able to communicate with the ADS 11 through a controller area network (CAN) or the like. The VCIB 40 receives various control requests from the ADS 11 and outputs the vehicle state to the ADS 11 by executing a predetermined API defined for each signal. Upon receiving a control request from the ADK 10, the VCIB 40 outputs a control instruction corresponding to the control request to a system corresponding to the control instruction through the integrated control manager 31. Further, the VCIB 40 acquires various pieces of information on the base vehicle 30 from various systems through the integrated control manager 31 and outputs the state of the base vehicle 30 as the vehicle state to the ADS 11.

The vehicle 1 can be used as one of components of a Mobility-as-a-Service (MaaS) system. The MaaS system includes, in addition to the vehicle 1, for example, a data server and a mobility service platform (MSPF) (neither of which is shown).

The MSPF is an integrated platform to which a wide variety of mobility services are connected. Autonomous driving-related mobility services are connected to the MSPF. Other than autonomous driving-related mobility services, mobility services provided by a ride-sharing company, a car-sharing company, a car rental company, a taxi company, an insurance company, and the like can be connected to the MSPF.

The vehicle 1 further includes a data communication module (DCM) (not shown) that can wirelessly communicate with the data server. For example, the DCM outputs pieces of vehicle information, such as the speed, the position, and the autonomous driving state, to the data server. Further, the DCM receives various pieces of data for managing the travel of the autonomous driving vehicles, including the vehicle 1, in an autonomous driving-related mobility service from the mobility service through the MSPF and the data server.

In the MSPF, APIs for using various pieces of data on the vehicle state and vehicle control required to develop the ADS 11 are publicly available. Using the APIs publicly available in the MSPF, various mobility services can use a wide variety of functions provided by the MSPF according to the contents of the service. For example, using an API publicly available in the MSPF, an autonomous driving-related mobility service can acquire drive control data on the vehicle 1, information stored in the data server, etc. from the MSPF. Further, using the API, the autonomous driving-related mobility service can transmit data for managing the autonomous driving vehicles including the vehicle 1 to the MSPF.

Detailed Configuration

Figure 2:
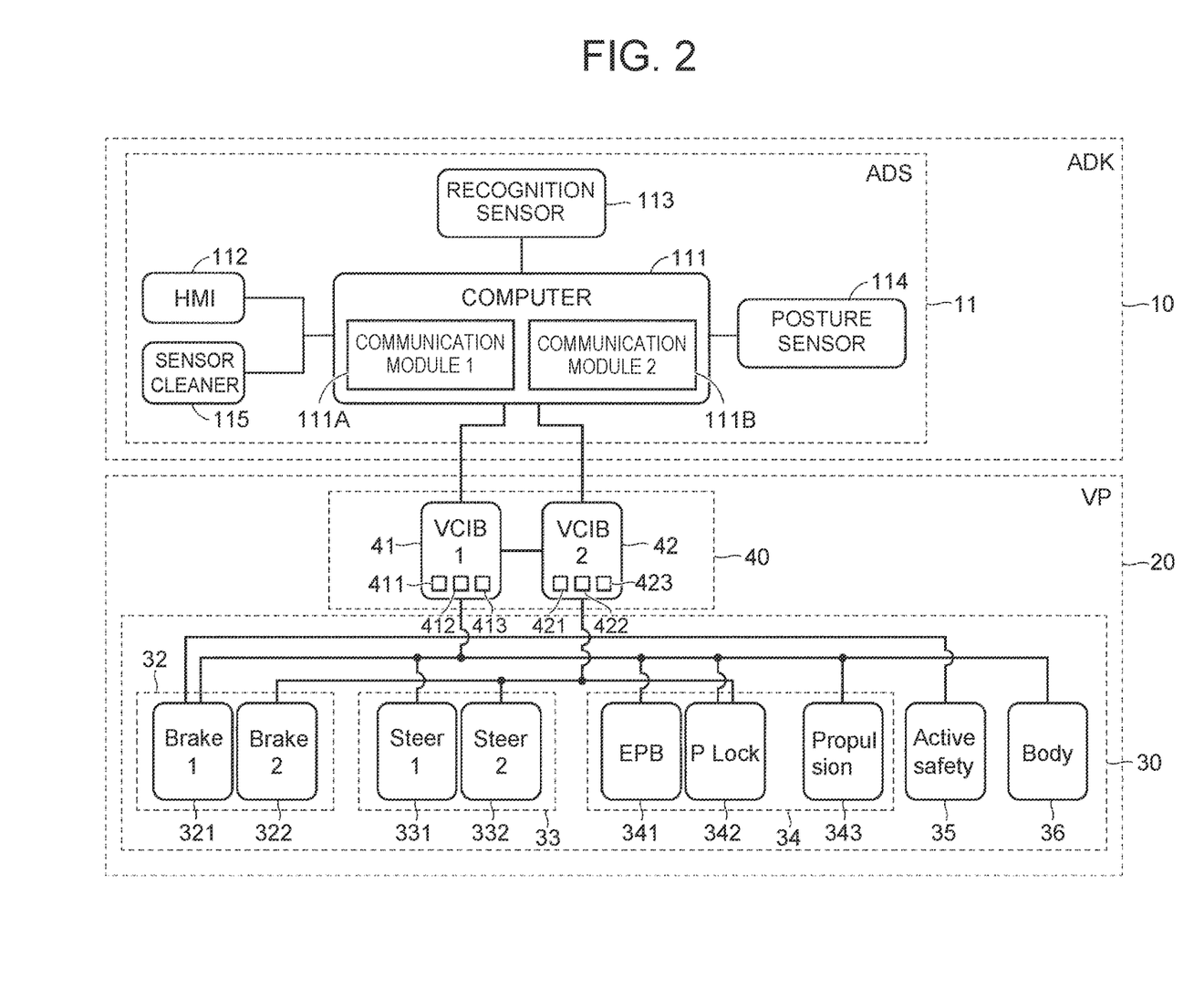
FIG. 2 is a diagram showing in detail the configurations of an ADS, a VCIB, and a VP according to the embodiment.

FIG. 2 is a diagram showing in detail the configurations of the ADS 11, the VCIB 40, and the VP 20 according to this embodiment. As shown in FIG. 2, the ADS 11 includes a computer 111, a human-machine interface (HMI) 112, a recognition sensor 113, a posture sensor 114, and a sensor cleaner 115.

The computer 111 includes a processor (not shown), such as a central processing unit (CPU), and memories (not shown), such as a read-only memory (ROM) and a random-access memory (RAM). The memories store programs that can be executed by the processor. The computer 111 acquires the environment of the vehicle 1 as well as the posture, the behavior, and the position of the vehicle 1 using various sensors (to be described later) during autonomous driving of the vehicle 1, and acquires the vehicle state from the VP 20 via the VCIB 40, and then sets the next action of the vehicle 1 (acceleration, deceleration, turning, etc.). The computer 111 outputs various instructions for realizing the next action to the VCIB 40. The computer 111 further includes communication modules 111A, 111B. Each of the communication modules 111A, 111B is configured to be able to communicate with the VCIB 40.

The HMI 112 presents information to a user and receives the user's operation during autonomous driving, during driving that requires the user's operation, and during transition between autonomous driving and driving requiring the user's operation. For example, the HMI 112 is configured to be connected to an input-output device (not shown), such as a touch panel display, provided in the base vehicle 30.

The recognition sensor 113 is a sensor for recognizing the environment of the vehicle 1. For example, the recognition sensor 113 includes at least one of a laser imaging detection and ranging (LIDAR), a millimeter-wave radar, and a camera (none of which is shown). The LIDAR measures a distance and a direction of a target by, for example, emitting an infrared pulsed laser beam and detecting reflected light of the laser beam coming from the target. The millimeter-wave radar measures a distance and a direction of a target by emitting millimeter waves and detecting reflected waves of the millimeter waves coming from the target. The camera is disposed, for example, on a rear side of a rearview mirror and takes an image of a front side of the vehicle 1.

The posture sensor 114 is a sensor for detecting the posture, the behavior, and the position of the vehicle 1. The posture sensor 114 includes, for example, an inertial measurement unit (IMU) and a global positioning system (GPS) (neither of which is shown). For example, the IMU detects an acceleration rate of the vehicle 1 in a front-rear direction, a left-right direction, and an up-down direction, and an angular speed of the vehicle 1 in a rolling direction, a pitch direction, and a yaw direction. The GPS detects the position of the vehicle 1 using information received from a plurality of GPS satellites circling in orbit around the Earth.

The sensor cleaner 115 is configured to remove contaminants adhering to the various sensors (a lens of the camera, a laser beam irradiation unit, etc.) using a cleaning fluid, a wiper, etc. while the vehicle 1 is traveling.

The VCIB 40 includes a VCIB 41 and a VCIB 42. The VCIBs 41, 42 respectively include processors 411, 421, such as central processing units (CPUs), memories 412, 422, such as read-only memories (ROMs) and random-access memories (RAMs), and communication units 413, 423 that are interfaces for communicating with an outside. The memories store programs that can be executed by the processor. The communication unit 413 of the VCIB 41 and the communication module 111A are communicably connected to each other. The communication unit 423 of the VCIB 42 and the communication module 111B are communicably connected to each other. Further, the communication unit 413 of the VCIB 41 and the communication unit 423 of the VCIB 42 are communicably connected to each other.

Each of the VCIBs 41, 42 relays a control request and vehicle information between the ADS 11 and the VP 20. More specifically, using an API, the VCIB 41 generates a control instruction from a control request received from the ADS 11.

Examples of control instructions (commands) corresponding to control requests supplied from the ADS 11 to the VCIB 40 include a propulsion direction command that requests switching of the shift range, an immovability command that requests activation or deactivation of the EPB system 341 and the P-Lock system 342, an acceleration command that requests acceleration or deceleration of the vehicle 1, a tire turning angle command that requests a tire turning angle of the turning wheels, an autonomization command that requests switching between an autonomous mode and a manual mode, and a stop command that requests keeping the vehicle in a stationary state or releasing the vehicle from the stationary state.

The VCIB 41 outputs the generated control instruction to a corresponding system among a plurality of systems included in the VP 20. Further, using an API, the VCIB 41 generates information showing the vehicle state from vehicle information received from the systems of the VP 20. The information showing the vehicle state may be the same information as the vehicle information, or may be information extracted from the vehicle information as information used for a process to be executed in the ADS 11. The VCIB 41 outputs the generated information showing the vehicle state to the ADS 11. The VCIB 42 operates in the same manner.

The brake system 32 includes brake systems 321, 322. The steering system 33 includes steering systems 331, 332. The powertrain system 34 includes an EPB system 341, a P-Lock system 342, and a propulsion system 343.

While the VCIB 41 and the VCIB 42 have basically equivalent functions, the VCIB 41 and the VCIB 42 are connected to partially different systems included in the VP 20. Specifically, the VCIB 41, the brake system 321, the steering system 331, the EPB system 341, the P-Lock system 342, the propulsion system 343, and the body system 36 are communicably connected to one another through a communication bus. The VCIB 42, the brake system 322, the steering system 332, and the P-Lock system 342 are communicably connected to each other through a communication bus.

Thus, as the VCIB 40 includes the VCIBs 41, 42 having equivalent functions in relation to the operation of some systems (braking, steering, etc.), there are redundant control systems between the ADS 11 and the VP 20. Therefore, when some trouble occurs in a system, the functions of the VP 20 can be maintained by, as necessary, switching the control system or shutting down a control system in which the trouble has occurred.

Each of the brake systems 321, 322 is configured to be able to control the braking device. The brake system 321 generates a braking instruction for the braking device according to a control request output from the ADS 11 through the VCIB 41. The brake system 322 generates a braking instruction for the braking device according to a control request output from the ADS 11 through the VCIB 42. The brake system 321 and the brake system 322 may have equivalent functions. Or one of the brake systems 321, 322 may be configured to be able to independently control the braking force of each wheel, while the other one may be configured to be able to control such that the same braking force is generated in each wheel. For example, the brake systems 321, 322 may control the braking device using a braking instruction generated by one of the brake systems and, when an abnormality occurs in that brake system, control the braking device using a braking instruction generated by the other brake system.

Each of the steering systems 331, 332 is configured to be able to control the steering angle of the steering wheel of the vehicle 1 using the steering device. The steering system 331 generates a steering instruction for the steering device according to a control request output from the ADS 11 through the VCIB 41. The steering system 332 generates a steering instruction for the steering device according to a control request output from the ADS 11 through the VCIB 42. The steering system 331 and the steering system 332 may have equivalent functions. Or, for example, the steering systems 331, 332 may control the steering device using a steering instruction generated by one of the steering systems and, when an abnormality occurs in that steering system, control the steering device using a steering instruction generated by the other steering system.

The EPB system 341 controls the EPB according to a control request output from the ADS 11 through the VCIB 41. The EPB is provided separately from the braking device (the disk brake system or the like), and fixes the wheels by operation of an actuator. For example, the EPB fixes the wheels by activating a drum brake for parking brake provided in some of the wheels by means of the actuator, or fixes the wheels by activating a braking device by means of an actuator that can adjust an oil pressure supplied to the braking device separately from the brake systems 321, 322. The EPB system 341 has a brake hold function and is configured to be able to switch between activation and deactivation of brake hold.

The P-Lock system 342 controls the P-Lock device according to a control request output from the ADS 11 through the VCIB 41. For example, the P-Lock system 342 activates the P-Lock device when the control request includes a control request for moving the shift range to a parking range (P-range), and deactivates the P-Lock device when the control request includes a control request for moving the shift range to other range than the P-range. The P-Lock device engages a protrusion at a leading end of a parking lock pawl, of which the position can be adjusted by an actuator, with teeth of a gear (lock gear) provided so as to be coupled to a rotating element inside the transmission of the vehicle 1. Thus, an output shaft of the transmission is fixed so as not to rotate, and the wheels are fixed.

The propulsion system 343 switches the shift range of the shift device and controls a drive force from a drive source (a motor-generator, an engine, etc.) according to a control request output from the ADS 11 through the VCIB 41. The shift ranges include, in addition to the P-range, for example, a neutral range (N-range), a forward travel range (D-range), and a rearward travel range (R-range).

The active safety system 35 is communicably connected to the brake system 321. As described above, the active safety system 35 detects obstacles on the front side using the camera 54 and/or the radar sensor 55 and, when it is determined that there is a possibility of a collision, outputs a braking instruction to the brake system 321 so as to increase the braking force.

The body system 36 controls parts including the direction indicator, the horn, and the wiper according to a control request output from the ADS 11 through the VCIB 41.

In the vehicle 1, autonomous driving is executed when, for example, the autonomous mode is selected by the user's operation of the HMI 112. In autonomous driving, the ADS 11 first creates a travel plan as described above. Examples of travel plans include a plan in which the vehicle continues to travel straight forward, a plan in which the vehicle turns left or right at a predetermined intersection at some point on a predetermined travel route, and a plan in which the vehicle changes lanes. In accordance with the created travel plan, the ADS 11 calculates control-related physical quantities (the acceleration rate, the deceleration rate, the tire turning angle, etc.) required for the vehicle 1 to operate. The ADS 11 divides the physical quantity for each execution period of an API. Using the API, the ADS 11 outputs a control request showing the divided physical quantity to the VCIB 40. Further, the ADS 11 acquires the vehicle state (the actual moving direction of the vehicle 1, the state of the vehicle being fixed, etc.) from the VP 20, and re-creates a travel plan reflecting the acquired vehicle state. In this way, the ADS 11 enables autonomous driving of the vehicle 1.

Control Using APIs

When installing the ADK 10 in a VP 20, enabling appropriate control for any VP 20 is considered as an issue.

As a solution, the memories 412, 422 of the VCIBs 41, 42 store pieces of execution information that are used to execute processes corresponding respectively to a plurality of APIs included in an API set that is a combination of APIs for requesting the VP 20 to execute a predetermined function and requesting transmission of predetermined information from the VP 20, and stores these pieces of execution information for a plurality of types of API sets beforehand.

The communication units 413, 423 of the VCIBs 41, 42 receive, from the ADK 10, a request according to an API included in a permitted API set that the ADK 10 is permitted to use beforehand among the plurality of types of API sets. The processors 411, 421 of the VCIBs 41, 42 execute a process corresponding to the request received by the communication units 412, 423 by using execution information for an API relating to the request among the pieces of execution information for the permitted API set stored in the memories 412, 422.

Thus, the pieces of execution information for the API sets corresponding respectively to the types of VPs 20 are stored beforehand in the memories 412, 422 of the VCIBs 41, 42, so that, in whichever VP 20 the VCIBs 41, 42 may be installed, the VP 20 can be appropriately controlled using an API set corresponding to the VP 20. As a result, any VP 20 can be appropriately controlled.

A plurality of types of APIs is specified as interfaces for the ADK 10 to interact with the VCIB 40 of the VP 20. An API is an interface for requesting the VP 20 to execute a predetermined function and requesting transmission of predetermined information from the VP 20. The APIs include, for example, APIs for control relating to the motion of the VP 20, APIs for control relating to electrical components of the VP 20, APIs for control relating to electricity of the VP 20, APIs for notification of a failure of the VP 20, and APIs for security of the VP 20.

For example, the APIs for control relating to the motion of the VP 20 include an API for a request (command) ordering the VP 20 to accelerate or decelerate, an API for a request (command) ordering a tire turning angle of the front wheels, an API for requesting notification of the speed (vehicle speed) in the traveling direction, and an API for requesting notification of the turning angle of the front wheels.

The APIs for control relating to the electrical components of the VP 20 include an API for a request (command) ordering a lighting state of the direction indicator, an API for a request (command) for turning an air conditioner on or off, an API for requesting notification of the lighting state of the direction indicator, and an API for requesting notification of a driving state of the air conditioner.

The API set that is a combination of usable APIs is determined beforehand by a manufacturer of the VP 20 according to the vehicle type, the model, the grade, etc. of the VP 20. For example, for a vehicle type A, an API set including 100 types of predetermined APIs is determined beforehand as a usable API set. Similarly, for vehicle types B and C, API sets including 200 types and 300 types, respectively, of predetermined APIs are determined beforehand as usable API sets.

The ROMs of the memories 412, 422 of the VCIBs 41, 42 store beforehand pieces of execution information (e.g., programs and data) that are used to execute processes corresponding respectively to the APIs included in the plurality of types of API sets. It has been hitherto necessary to manufacture, for each of the vehicle types A to C, the VCIBs 41, 42 storing execution information corresponding to that vehicle type and distribute the VCIBs 41, 42 to be incorporated into the VP 20.

In this embodiment, the pieces of execution information for a plurality of APIs included in each API set of a plurality of types of API sets corresponding to pluralities of vehicle types like the vehicle types A to C, models, grades, etc. are stored beforehand in the ROMs of the memories 412, 422 of the VCIBs 41, 42.

Figure 3:
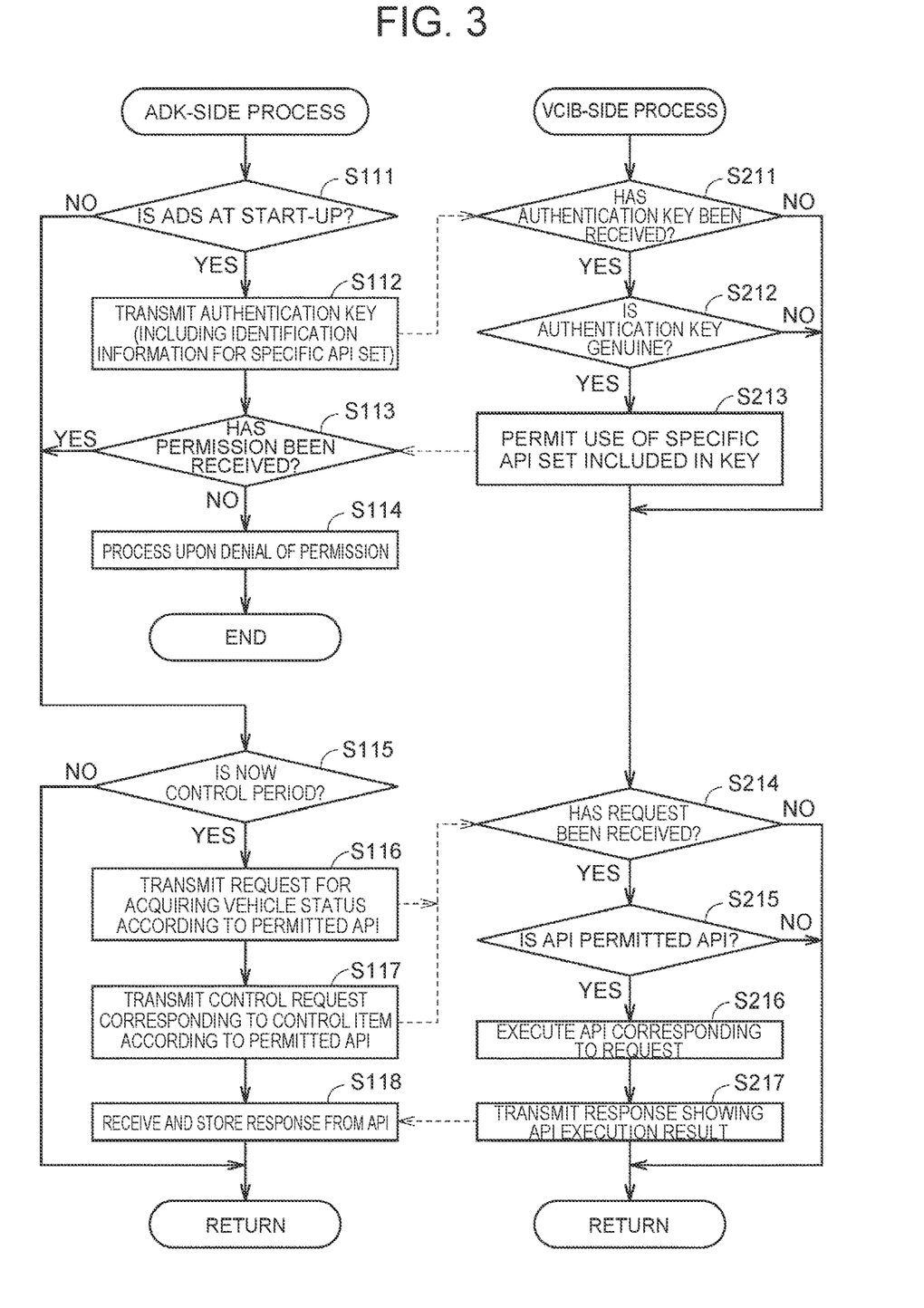
FIG. 3 is a flowchart showing a flow of a process for control using APIs of this embodiment.

FIG. 3 is a flowchart showing a flow of a process for control using APIs in this embodiment. The ADK-side process and the VCIB-side process of FIG. 3 are each called up from a higher-order process in each predetermined control period and executed by the computer 111 of the ADS 11 of the ADK 10 and the VCIB 40 (or the integrated control manager 31) of the VP 20. The steps included in the flowchart shown in FIG. 3 are realized by software processing by the ADS 11 (computer 111) or the VP 20 (the VCIB 40 or the integrated control manager 31), but may instead be realized by hardware (electric circuit) disposed inside the ADS 11 or the VP 20.

Here, before manufacturing the ADK 10, the manufacturer of the ADK 10 applies to a person who gives permission for the use of an API set (e.g., the manufacturer of the vehicle 1, the manufacturer of the VP 20, or the manufacturer of the VCIB 40) for permission of the use of a specific API set among a plurality of types of API sets that the manufacturer of the ADK 10 wishes to use in the ADK 10. In response to this application, the person who gives permission for the use of an API set gives the manufacturer of the ADK 10 data of an authentication key that is authentication information including type information by which the specific API set of which the use has been applied for and permitted can be identified. When manufacturing the ADK 10, the manufacturer of the ADK 10 stores the data of the authentication key received from the person who gives permission for the use of the specific API set in the ROM of the computer 111 of the ADS 11 of the ADK 10.

Referring to FIG. 3, in the ADK 10, the computer 111 of the ADS 11 determines whether the ADS 11 is at start-up (step S111). When it is determined that the ADS 11 is at start-up (YES in step S111), the computer 111 controls the communication modules 111A, 111B so as to transmit, to the VCIB 40, the data of the authentication key including the type information on the specific API set that is stored in the ROM of the computer 111 (step S112).

In the VCIB 40, the processors 411, 421 of the VCIBs 41, 42 determine whether the data of the authentication key has been received from the ADK 10 by the communication units 413, 423 (step S211). When it is determined that the data of the authentication key has been received (YES in step S211), the processors 411, 421 determine whether the received authentication key is genuine (step S212). A commonly known method can be used as the method for determining whether the authentication key is genuine. For example, in the ROMs of the memories 412, 422 of the VCIBs 41, 42, pieces of execution information for a plurality of types of API sets are stored beforehand, and a plurality of pieces of genuineness determination data corresponding respectively to these pieces of execution information are stored beforehand. The method for determining whether the authentication data is genuine may be a method that determines genuineness using a piece of genuineness determination data corresponding to the received authentication key among the pieces of genuineness determination data stored in the ROMs of the memories 412, 422 of the VCIBs 41, 42.

When it is determined that the authentication key is genuine (YES in step S212), the processors 411, 421 permit the specific API set indicated by the type information included in the authentication key to be used in the VP 20 (step S213). Specifically, the processors 411, 421 store information showing that the use of the specific API set is permitted in the RAMs of the memories 412, 422 of the VCIBs 41, 42. Further, the processors 411, 421 transmit information that the use of the specific API set has been permitted to the ADK 10. When it is determined that the authentication key is not genuine, the processors 411, 421 may transmit information that the use of the specific API set is not permitted to the ADK 10.

In the ADK 10, the computer 111 of the ADS 11 determines whether the information that the use of the specific API set is permitted has been received from the VCIBs 41, 42 (step S113). When it is determined that the information on permission has not been received (NO in step S113), the computer 111 executes a process upon denial of permission (step S114). The process upon denial of permission may be any process that makes the specific API set unusable, for example, a process of shutting down the ADK 10.

When it is determined that information that the use of the specific API set is permitted has been received (YES in step S113), or when it is determined that the ADS 11 is not at start-up (NO in step S111) and that the use of the specific API set has already been permitted, the computer 111 determines whether now is the control period of an API (step S115). Control of the VP 20 using an API is time-shared control in each predetermined control period.

When it is determined that now is the control period (YES in step S115), in a program being executed in the computer 111, the computer 111 controls the communication modules 111A, 111B so as to transmit a request, if any, for acquiring a predetermined status among vehicle statuses of the VP 20 according to an API included in the specific API set of which the use is permitted (step S116). For example, in a travel control program being executed in the computer 111, when there is a request for acquiring a vehicle speed in the traveling direction, the computer 111 controls the communication modules 111A, 111B so as to transmit the request according to the API for requesting notification of the vehicle speed in the traveling direction.

Further, in the program being executed in the computer 111, the computer 111 controls the communication modules 111A, 111B so as to transmit a request, if any, for control according to a predetermined control item among control items of the VP 20 according to an API included in the specific API set of which the use is permitted (step S117). For example, in the travel control program being executed in the computer 111, when there is a request ordering the VP 20 to accelerate, the computer 111 controls the communication modules 111A, 111B so as to transmit the request according to the API for a request ordering the VP 20 to accelerate.

In the VCIB 40, the processors 411, 421 of the VCIBs 41, 42 determine whether any request has been received from the ADK 10 by the communication units 413, 423 (step S214). When it is determined that any request has been received (YES in step S214), the processors 411, 421 determine whether the API corresponding to the received request is a permitted API included in the API set of which the use is permitted (step S215). When no request has been received from the ADK 10 (NO in step S214), or when it is determined that the API corresponding to the received request is not a permitted API (NO in step S215), the process to be executed is returned to the higher-order process from which the VCIB-side process has been called up.

When it is determined that the API corresponding to the received request is not a permitted API, the processors 411, 421 may execute a predetermined process for the case where a request for executing an API that is not a permitted API has been received. For example, as the predetermined process, the processors 411, 421 may execute a process of transmitting a notification that a request for executing an API that is not a permitted API has been received to a person who gives permission for the use of an API set.

When it is determined that the API corresponding to the received request is a permitted API (YES in step S215), the processors 411, 421 execute a process corresponding to the API using the execution information for the API corresponding to the received request (step S216) and, when there is a result of execution of the process corresponding to the API, controls the communication units 413, 423 so as to transmit a response showing the execution result to the ADK 10 (step S217). Thereafter, the processors 411, 421 return the process to be executed to the higher-order process from which the VCIB-side process has been called up.

For example, when the received request is a request for notification of the vehicle speed in the traveling direction, the processors 411, 421 execute a process of acquiring the vehicle speed using the execution information for the API for notification of the vehicle speed in the traveling direction (e.g., a process of acquiring the vehicle speed from the propulsion system 343) according to the received request, and control the communication units 413, 423 so as to transmit the acquired vehicle speed to the ADK 10. When the received request is a request ordering the VP 20 to accelerate, the processors 411, 421 execute a process for accelerating the vehicle speed (e.g., a process of transmitting an acceleration command to the propulsion system 343) according to the received request.

In the ADK 10, when a response showing an execution result of the process corresponding to the API has been received from the VCIBs 41, 42 by the communication modules 111A, 111B, the computer 111 of the ADS 11 stores the execution result shown by the received response in the RAM of the computer 111 (step S118). For example, when a vehicle speed in the traveling direction has been received as a response showing an execution result of the process corresponding to the API, the computer 111 stores the vehicle speed in the RAM of the computer 111. For example, the execution result of the API stored in the RAM of the computer 111 is used by the ADK 10 to control the VP 20 in the next control period.

After step S118, or when it is determined that now is not the control period (NO in step S115), the computer 111 of the ADS 11 returns the process to be executed to a higher-order process from which the ADK-side process has been called up.

Modified Examples (1) In the embodiment described above, whether the authentication key is genuine is confirmed at start-up of the ADK 10 as shown in step S111 to step S113 of FIG. 3. However, without being limited thereto, the confirmation may be performed at other timing, for example, at the start of autonomous driving when the vehicle 1 that has already been traveling switches to autonomous driving in the middle of traveling.

(2) In the embodiment described above, the process according to an API is executed in each control period as shown in step S115 of FIG. 3. However, without being limited thereto, the process according to an API may be executed at other timing, for example, at a timing when a process according to an API is executed by a travel control program being executed in the ADK 10.

(3) In the embodiment described above, whether an API corresponding to a request is a permitted API included in a specific API set of which the use is permitted is determined each time a request is received as shown in step S215 of FIG. 3. However, without being limited thereto, whether an API corresponding to a request is a permitted API may be determined at other timing, for example, each time a predetermined number of requests have been made or at intervals of a predetermined period. Alternatively, at a stage when the use of the specific API set is permitted in step S213, APIs corresponding to all the subsequent requests may be regarded as permitted APIs, and execution of determination of whether the API is a permitted API may be omitted at the timing of receiving a request.

(4) In the embodiment described above, the ADK 10 and the VCIBs 41, 42 are connected to each other through the CAN. However, without being limited thereto, the means for connecting the ADK 10 and the VCIBs 41, 42 to each other may be any connection system, and may be an on-board communication network different from a CAN or a communication system using other communication method.

(5) The embodiment described above can be regarded as disclosure of devices such as the vehicle 1, the ADK 10, the ADS 11, the VP 20, the base vehicle 30, and the VCIB 40, as well as disclosure of control methods or control programs in these devices.

Summary (1) As shown in FIG. 1 and FIG. 2, the vehicle 1 includes the VP 20 having functions to run, turn, and stop, the ADK 10 that is attachable to and detachable from the VP 20 and gives an instruction for autonomous driving to the VP 20, and the VCIB 40 that outputs a control command for controlling the VP 20. As shown in FIG. 2, the VCIB 40 (VCIBs 41, 42) includes the memories 412, 422, the communication units 413, 423, and the processors 411, 421. As shown in FIG. 2 and FIG. 3, the memories 412, 422 store the pieces of execution information that are used to execute processes corresponding respectively to a plurality of APIs included in an API set that is a combination of APIs for requesting the VP 20 to execute a predetermined function and requesting transmission of predetermined information from the VP 20, and store these pieces of execution information for a plurality of types of API sets beforehand. As shown in FIG. 2 and FIG. 3, the communication units 413, 423 receive, from the ADK 10, a request according to an API included in a permitted API set that the ADK 10 is permitted to use beforehand among the plurality of types of API sets (e.g., step S214). The processors 411, 421 execute a process corresponding to the request received by the communication units 413, 423 by using execution information for an API relating to the request among the pieces of execution information for the permitted API set stored in the memories 412, 422 (step S216, step S217).

Thus, the pieces of execution information for the API sets corresponding respectively to the types of VPs 20 are stored beforehand in the memories 412, 422 of the VCIBs 41, 42, so that, in whichever VP 20 the VCIBs 41, 42 may be installed, the VP 20 can be appropriately controlled using the API set corresponding to the VP 20. As a result, any VP 20 can be appropriately controlled.

Further, by storing the pieces of execution information for the API sets corresponding to a plurality of types of VPs 20, the VCIBs 41, 42 can adapt to a plurality of types of VPs 20. This eliminates the need to prepare, for each VP 20, the VCIBs 41, 42 for an API set corresponding to the VP 20. Thus, the costs of manufacturing and distributing the VCIBs 41, 42 can be reduced.

(2) The communication units 413, 423 may receive, from the ADK 10, authentication information by which the permitted API set can be identified, and the processors 411, 421 may determine whether permission for the use of the permitted API set identified by the authentication information received by the communication units 413, 423 is genuine. When it is determined that permission for the use of the permitted API set is genuine, the processors 411, 421 may execute the process corresponding to the request received by the communication units 413, 423.

Thus, the VP 20 can be controlled by reliably using an appropriate API set corresponding to the VP 20.

(3) The manufacturer of the vehicle 1, the VP 20, or the VCIBs 41, 42 may permit the manufacturer of the ADK 10 to use the permitted API set beforehand. Thus, if the ADK 10 is one manufactured by a manufacturer who is permitted beforehand to use the permitted API set, the ADK 10 can appropriately control a VP 20 when installed in the VP 20.

(4) The ADK 10 and the VCIBs 41, 42 may be connected to each other by an on-board communication network (e.g., a CAN). Thus, the ADK 10 and the VCIBs 41, 42 can reliably communicate with each other.

The embodiment disclosed this time should be construed as being in every respect merely illustrative and not restrictive. The scope of this disclosure is shown not by the above description of the embodiment but by the claims, and is intended to include all changes equivalent in meaning and scope to the claims.

What is claimed is:

1. A vehicle comprising a vehicle platform having functions to run, turn, and stop, an autonomous driving kit that is attachable to and detachable from the vehicle platform and gives an instruction for autonomous driving to the vehicle platform, and a vehicle control interface box that outputs a control command for controlling the vehicle platform, wherein:
    the vehicle control interface box includes memory and one or more processors;
    the memory being configured to store pieces of execution information that are used to execute processes corresponding respectively to a plurality of application program interfaces (APIs) included in an API set that is a combination of APIs for requesting the vehicle platform to execute a predetermined function and requesting transmission of predetermined information from the vehicle platform, the pieces of execution information being stored for a plurality of types of API sets beforehand;
    the plurality of types of API sets include a first API set that corresponds to the vehicle platform on which the vehicle control interface box is installed and a second API set that corresponds to a vehicle platform different from the vehicle platform on which the vehicle control interface box is installed;
    the one or more processors are configured to:
        receive, from the autonomous driving kit, a request according to an API included in a permitted API set that the autonomous driving kit is permitted to use beforehand among the plurality of types of API sets; and
        execute a process corresponding to the request by using execution information for an API relating to the request among the pieces of execution information for the permitted API set stored in the memory.

2. The vehicle according to claim 1, wherein:
    the one or more processors are further configured to:
        receive authentication information that allows identification of the permitted API set from the autonomous driving kit; and determine whether permission for use of the permitted API set identified by the authentication information is genuine; and when the one or more processors determine that permission for use of the permitted API set is genuine, the one or more processors execute the process corresponding to the request.

3. The vehicle according to claim 2, wherein a manufacturer of the vehicle, the vehicle platform, or the vehicle control interface box provides a manufacturer of the autonomous driving kit with the authentication information to use the permitted API set beforehand.

4. The vehicle according to claim 2, wherein after determining that permission for use of the permitted API set is genuine, the one or more processors are configured to execute processes corresponding to subsequent requests according to APIs included in the permitted API set without performing a determination of whether each API corresponding to each subsequent request is a permitted API, for either a predetermined number of subsequent requests or until a predetermined time period has elapsed.

5. The vehicle according to claim 1, wherein the autonomous driving kit and the vehicle control interface box are connected to each other through an on-board communication network.

6. A vehicle platform having functions to run, turn, and stop, wherein:
the vehicle platform includes a vehicle control interface box that outputs a control command for controlling the vehicle platform;
the vehicle control interface box includes memory and one or more processors;
the memory stores pieces of execution information that are used to execute processes corresponding respectively to a plurality of APIs included in an API set that is a combination of APIs for requesting the vehicle platform to execute a predetermined function and requesting transmission of predetermined information from the vehicle platform, the pieces of execution information being stored for a plurality of types of API sets beforehand;
the plurality of types of API sets include a first API set that corresponds to the vehicle platform on which the vehicle control interface box is installed and a second API set that corresponds to a vehicle platform different from the vehicle platform on which the vehicle control interface box is installed;
the one or more processors receive, from an autonomous driving kit that is attachable to and detachable from the vehicle platform and gives an instruction for autonomous driving to the vehicle platform, a request according to an API included in a permitted API set that the autonomous driving kit is permitted to use beforehand among the plurality of types of API sets; and
the one or more processors execute a process corresponding to the request by using execution information for an API relating to the request among the pieces of execution information for the permitted API set stored in the memory.

7. A vehicle control interface box that is installed in a vehicle platform having functions to run, turn, and stop and outputs a control command for controlling the vehicle platform, wherein:
the vehicle control interface box comprises memory and one or more processors;
the memory stores pieces of execution information that are used to execute processes corresponding respectively to a plurality of APIs included in an API set that is a combination of APIs for requesting the vehicle platform to execute a predetermined function and requesting transmission of predetermined information from the vehicle platform, the pieces of execution information being stored for a plurality of types of API sets beforehand;
the plurality of types of API sets include a first API set that corresponds to the vehicle platform on which the vehicle control interface box is installed and a second API set that corresponds to a vehicle platform different from the vehicle platform on which the vehicle control interface box is installed;
the one or more processors receive, from an autonomous driving kit that is attachable to and detachable from the vehicle platform and gives an instruction for autonomous driving to the vehicle platform, a request according to an API included in a permitted API set that the autonomous driving kit is permitted to use beforehand among a plurality of types of API sets; and
the one or more processors execute a process corresponding to the request by using execution information for an API relating to the request among the pieces of execution information for the permitted API set stored in the memory.

8. An autonomous driving kit that is attachable to and detachable from a vehicle platform having functions to run, turn, and stop and gives an instruction for autonomous driving to the vehicle platform, the autonomous driving kit comprising a processor configured to:
transmit, to the vehicle platform, a request according to an API included in a permitted API set that the autonomous driving kit is permitted to use beforehand among a plurality of types of API sets that is each a combination of APIs for requesting the vehicle platform to execute a predetermined function and requesting transmission of predetermined information from the vehicle platform, wherein
the plurality of types of API sets include a first API set that corresponds to the vehicle platform, and a second API set that corresponds to a vehicle platform different from the vehicle platform,
in the vehicle platform, a process corresponding to the request is executed by using execution information for an API relating to the request among pieces of execution information that are used to execute processes corresponding respectively to a plurality of APIs included in the permitted API set.

9. A control method of a vehicle including a vehicle platform having functions to run, turn, and stop, an autonomous driving kit that is attachable to and detachable from the vehicle platform and gives an instruction for autonomous driving to the vehicle platform, and a vehicle control interface box that outputs a control command for controlling the vehicle platform,
the vehicle control interface box including memory and one or more processors,
the memory storing pieces of execution information that are used to execute processes corresponding respectively to a plurality of APIs included in an API set that is a combination of APIs for requesting the vehicle platform to execute a predetermined function and requesting transmission of predetermined information from the vehicle platform, the pieces of execution information being stored for a plurality of types of API sets beforehand, the plurality of types of API sets include a first API set that corresponds to the vehicle platform on which the vehicle control interface box is installed and a second API set that corresponds to a vehicle platform different from the vehicle platform on which the vehicle control interface box is installed, the control method comprising:

receiving, by the one or more processors, from the autonomous driving kit, a request according to an API included in a permitted API set that the autonomous driving kit is permitted to use beforehand among a plurality of types of API sets; and executing, by the one or more processors, a process corresponding to the request by using execution information for an API relating to the request among the pieces of execution information for the permitted API set stored in the memory.

10. A control method of a vehicle platform having functions to run, turn, and stop, the control method employing an autonomous driving kit that is attachable to and detachable from the vehicle platform and gives an instruction for autonomous driving to the vehicle platform, the autonomous driving kit including a processor, the control method comprising transmitting, by the processor, to the vehicle platform, a request according to an API included in a permitted API set that the autonomous driving kit is permitted to use beforehand among a plurality of types of API sets that is each a combination of APIs for requesting the vehicle platform to execute a predetermined function and requesting transmission of predetermined information from the vehicle platform, wherein the plurality of types of API sets include a first API set that corresponds to the vehicle platform, and a second API set that corresponds to a vehicle platform different from the vehicle platform, in the vehicle platform, a process corresponding to the request is executed by using execution information for an API relating to the request among pieces of execution information that are used to execute processes corresponding respectively to a plurality of APIs included in the permitted API set.

* * * * *